US 6,643,444 B1

(12) United States Patent
Putnam

(10) Patent No.: US 6,643,444 B1
(45) Date of Patent: Nov. 4, 2003

(54) OPTICAL FIBER SPOOL ASSEMBLY

(75) Inventor: Stephen M. Putnam, Acton, MA (US)

(73) Assignee: Digital Lightwave, Inc., Clearwater, FL (US)

( * ) Notice: Subject to any disclaimer, the term of this patent is extended or adjusted under 35 U.S.C. 154(b) by 0 days.

(21) Appl. No.: 10/096,951

(22) Filed: Mar. 14, 2002

(51) Int. Cl.[7] .............................. G02B 6/00
(52) U.S. Cl. .................. 385/135; 385/134; 385/137
(58) Field of Search ................. 385/134–137

(56) References Cited

U.S. PATENT DOCUMENTS 4,722,585 A * 2/1988 Boyer .................... 385/135
5,802,237 A * 9/1998 Pulido .................... 385/135
6,038,362 A * 3/2000 Toyoda et al. ............ 385/137
2002/0131749 A1 * 9/2002 Swenson et al. .......... 385/135

* cited by examiner

Primary Examiner—Hemang Sanghavi
Assistant Examiner—Scott A Knauss
(74) Attorney, Agent, or Firm—Hunton & Williams

(57) ABSTRACT

A technique for storing and managing optical fiber is disclosed. In one embodiment, the technique is realized as an optical fiber spool assembly comprising an inner spool component and an outer housing component. The inner spool component beneficially comprises a first center base section surrounded by a first annular ring section. The outer housing component beneficially comprises a second center base section surrounded by a second annular ring section. An annular optical fiber cavity for retaining an optical fiber is formed when the inner spool component and the outer housing component are assembled.

13 Claims, 5 Drawing Sheets

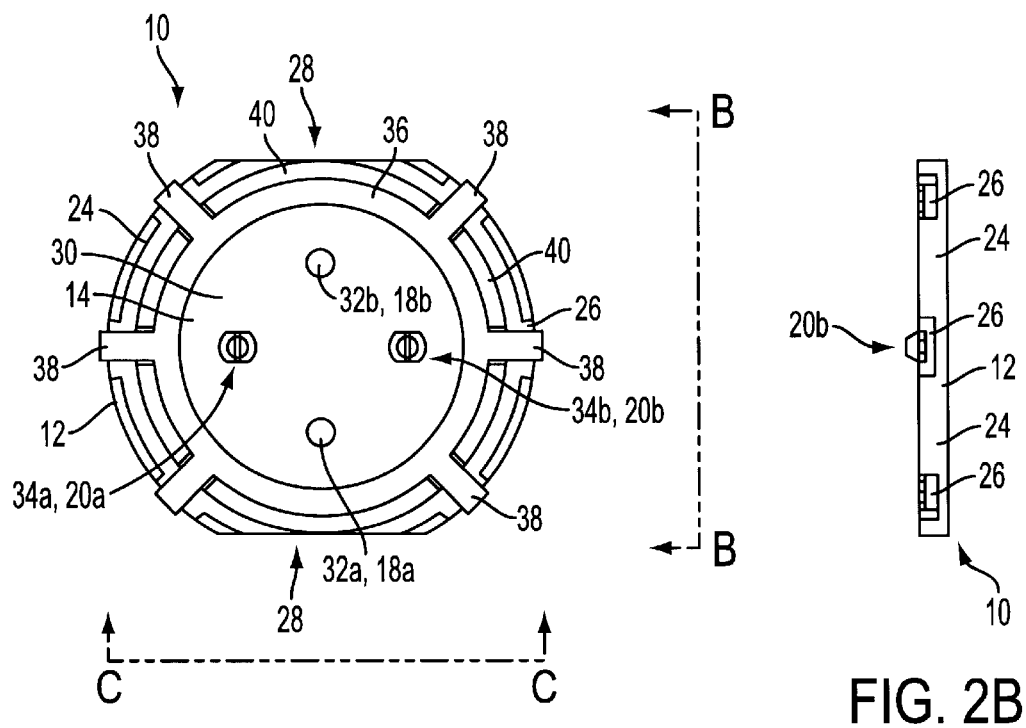
FIG. 2A
FIG. 2B
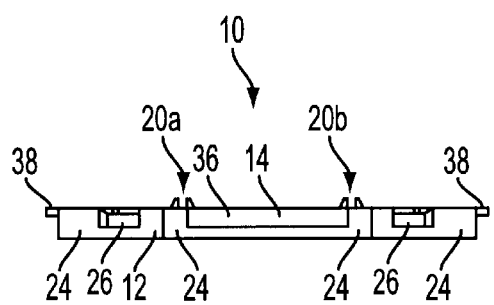
FIG. 2C

OPTICAL FIBER SPOOL ASSEMBLY

FIELD OF THE INVENTION

The present invention relates generally to optical fiber storage and management and, more particularly, to an optical fiber spool assembly.

BACKGROUND OF THE INVENTION

With the advent of optical telecommunications, the use of optical fiber is now widespread throughout the telecommunication industry. For example, on a system level, optical fiber may be used to optically connect long distance telephone transmitting and receiving stations. On a sub-system or component level, optical fiber may be used to optically connect optical components such as, for example, optical signal sources (e.g., laser diodes), optical signal detectors (e.g., photodetectors), optical connectors, optical beam adjusters (e.g., beamsplitters, lenses, etc.), and even dense wavelength division multiplexing devices.

At the system level, optical fiber is typically coated with one or more protective layers so as to shield the optical fiber from damaging elements and contamination. However, at the sub-system or component level, optical fiber is often unprotected except for any shielding provided by the sub-system or component itself. For example, an uncoated optical fiber may be used to transmit an optical signal from an optical connector to a lens system in an optical spectrometer, wherein the uncoated optical fiber, the optical connector, and the lens system are all contained within a protective casing of the optical spectrometer.

Regardless of whether an optical fiber is coated or uncoated, it is sometimes useful or required to manage the optical fiber in a controlled manner. For example, spare coated optical fiber may.be stored on a fiber spool. Also, an uncoated optical fiber of a specified length is typically required to be wound around a fiber spool in a optical spectrometer. In either case, present day fiber spools often require an optical fiber to be hand wound in and out of optical fiber retaining features associated with the fiber spool. For example, a quadrant-based fiber spooling device manufactured by FICO (P/N EFA040ASSY) requires an optical fiber to be hand wound in and out of optical fiber retaining features associated with each quadrant of the fiber spooling device. Also, this quadrant-based fiber spooling device by FICO requires separate mounting hardware and alignment means for each quadrant of the fiber spooling device. Further, due at least in part to the required separate mounting hardware and alignment means, this quadrant-based fiber spooling device by FICO has a relatively high profile, which can be problematic when packaging in low profile environments is required.

In view of the foregoing, it would be desirable to provide a technique for storing and managing optical fiber which overcomes the above-described inadequacies and shortcomings. More particularly, it would be desirable to provide a technique for storing and managing optical fiber in an efficient and cost effective manner.

SUMMARY OF THE INVENTION

According to the present invention, a technique for storing and managing optical fiber is provided. In one exemplary embodiment, the technique is realized as an optical fiber spool assembly comprising an inner spool component and an outer housing component. The inner spool component beneficially comprises a first center base section surrounded by a first annular ring section. The first center base section beneficially comprises first assembly engagement means. The annular ring section beneficially comprises at least one optical fiber retaining tab formed along a top surface thereof and at least one lip member formed along a bottom surface thereof. The annular ring section, the at least one optical fiber retaining tab, and the at least one lip member form three sides of an annular optical fiber cavity.

The outer housing component beneficially comprises a second center base section surrounded by a second annular ring section. The second center base section beneficially comprises second assembly engagement means for engaging the first assembly engagement means. The second annular ring section beneficially comprises at least one optical fiber retaining wall formed thereon. The at least one optical fiber retaining wall beneficially comprises an inner diameter that is greater than an outer diameter of the first annular ring section such that the at least one optical fiber retaining wall forms a fourth side to the annular optical fiber cavity when the inner spool component and the outer housing component are assembled.

The present invention will now be described in more detail with reference to exemplary embodiments thereof as shown in the appended drawings. While the present invention is described below with reference to preferred embodiments, it should be understood that the present invention is not-limited thereto. Those of ordinary. skill in the art having access to the teachings herein will recognize additional implementations, modifications, and embodiments, as well as other fields of use, which are within the scope of the present invention as disclosed and claimed herein, and with respect to which the present invention could be of significant utility.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

FIG. 2A is a top view of the optical fiber spool assembly shown in FIG. 1 in assembled form in accordance with the present invention.

FIG. 2B is a side view of the assembled optical fiber spool assembly shown in FIG. 2A along line A—A of FIG. 2A in accordance with the present invention.

FIG. 2C is a side view of the assembled optical fiber spool assembly shown in FIG. 2A along line C—C of FIG. 2A in accordance with the present invention.

DETAILED DESCRIPTION OF EXEMPLARY EMBODIMENT(S)

Figure 1:
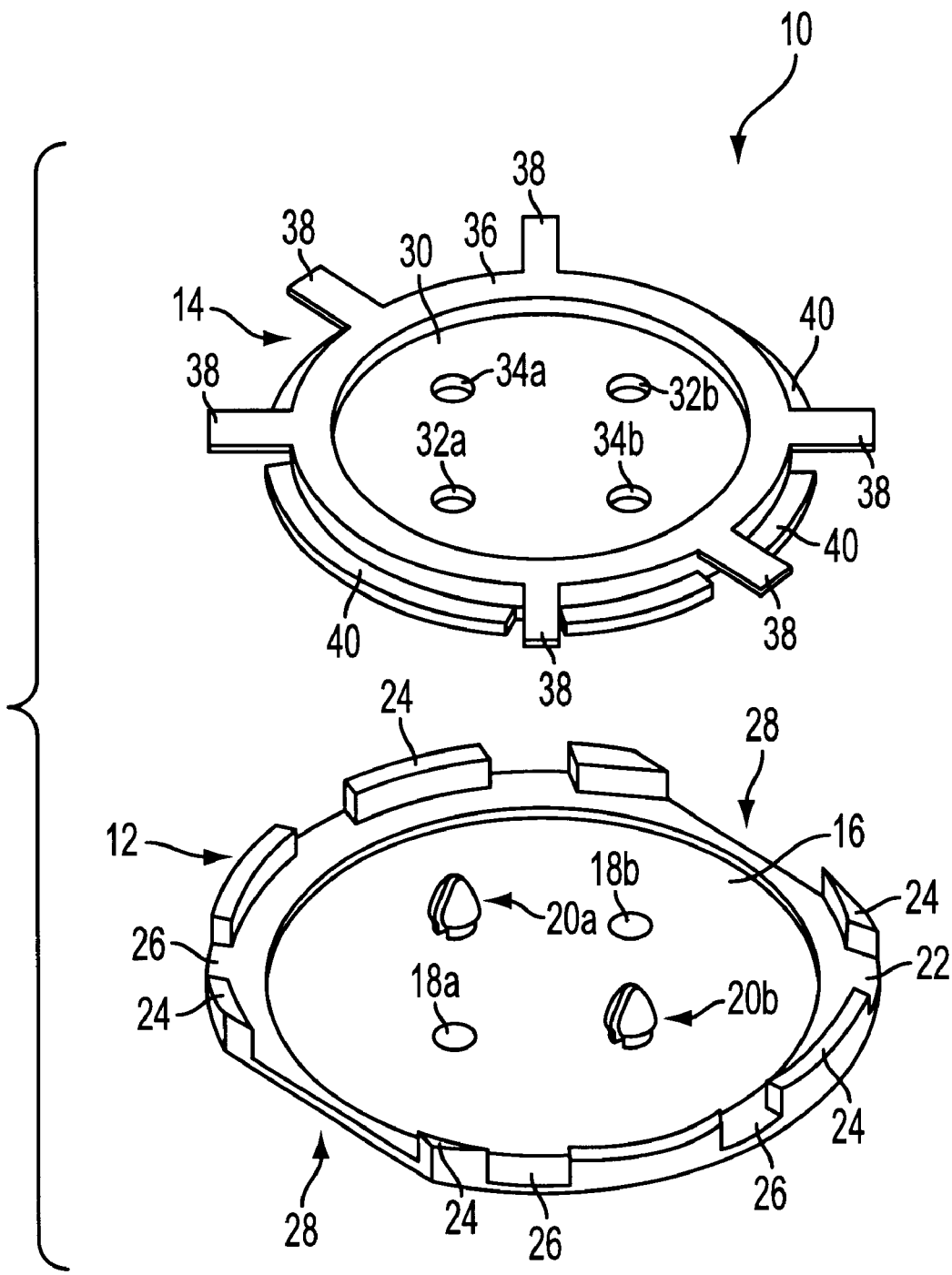
FIG. 1 shows a perspective exploded view of an optical fiber spool assembly in accordance with the present invention.

Referring to FIG. 1, there is shown a perspective exploded view of an optical fiber spool assembly 10 in accordance with the present invention. The optical fiber spool assembly 10 comprises an outer housing component 12 and an inner spool component 14, which are assembled together in a mating manner as described in detail below.

The outer housing component 12 comprises a circular center base section 16 into which two mounting holes 18 and onto which two locking post pairs 20 are formed. As described in detail below, the two mounting holes 18 formed in the outer housing component 12 are aligned with two mating mounting holes 32 formed in the inner spool component 14 when the optical fiber spool assembly 10 is assembled, thereby allowing mounting screws (not shown) to pass through both sets of mounting holes (i.e., mounting holes 18 and mounting holes 32) for securing the assembled optical fiber spool assembly 10 to some support structure (not shown). As also described in detail below, the two locking post pairs 20 formed in the outer housing component 12 are aligned and engaged with two mating assembly holes 34 formed in the inner spool component 14 when the optical fiber spool assembly 10 is assembled, thereby insuring secure assembly of the optical fiber spool assembly 10.

The circular center base section 16 is surrounded by a raised annular ring section 22. Thus, the circular center base section 16 is recessed below the raised annular ring section 22. As described in detail below, a lower portion of the inner spool component 14 is seated within the recessed circular center base section 16, surrounded by the raised annular ring section 22, when the optical fiber spool assembly 10 is assembled.

The raised annular ring section 22 has a plurality of optical fiber retaining walls 24 formed thereon. The retaining walls 24 are spaced apart from each other so as to form a plurality of openings 26 therebetween. As described in detail below, the plurality of openings 26 are aligned with and accept a corresponding plurality of optical fiber retaining tabs 38 formed on the inner spool component 14 when the optical fiber spool assembly 10 is assembled.

At this point it should be noted that the outer housing component 12 has two flats 28 formed along the outer diameter of thereof. The two flats 28 are formed so as to allow the assembled optical fiber spool assembly 10 to fit into a particular predetermined package dimension. That is, these flats 28 are not required of all embodiments of the optical fiber spool assembly 10 in accordance with the present invention, but rather are shown to illustrate that the optical fiber spool assembly 10 may be altered within the scope of the present invention. For example, the outer housing component 12 may still be formed without the flats 28 such that the raised annular ring section 22, the retaining walls 24, and the openings 26 may extend all the way around the outer housing component 12 (i.e., into the areas where the flats 28 are shown formed in FIG. 1) in accordance with the present invention.

The inner spool component 14 comprises a circular center base section 30 into which two mounting holes 32 and two assembly holes 34 are formed. As mentioned above, the two mounting holes 32 formed in the inner spool component 14 are aligned with two mating mounting holes 18 formed in the outer housing component 12 when the optical fiber spool assembly 10 is assembled, thereby allowing mounting screws (not shown) to pass through both sets of mounting holes (i.e., mounting holes 32 and mounting holes 18) for securing the assembled optical fiber spool assembly 10 to some support structure (not shown). Specifically, mounting hole 32a aligns with mounting hole 18a and mounting hole 32b aligns with mounting hole 18b when the optical fiber spool assembly 10 is assembled.

As also mentioned above, the two assembly holes 34 formed in the inner spool component 14 are aligned and engaged with the two locking post pairs 20 formed in the outer housing component 12 when the optical fiber spool assembly 10 is assembled, thereby insuring secure assembly of the optical fiber spool assembly 10. Specifically, assembly hole 34a aligns and engages with locking post pair 20a and assembly hole 34b aligns and engages with locking post pair 20b when the optical fiber spool assembly 10 is assembled. The actual engagement operation between the assembly holes 34 and the locking post pairs 20 is described in more detail below.

The mounting holes 32 and the assembly holes 34 (as well as the mounting holes 18 and the locking post pairs 20) are shown formed in a square pattern, but other patterns are also possible in accordance with the present invention. For example, the mounting holes 32 and the assembly holes 34 (as well as the mounting holes 18 and the locking post pairs 20) may be formed in a different pattern which allows keyed assembly of the inner spool component 14 with the outer housing component 12, thereby insuring consistent assembly. Also, the number of mounting holes 32 and assembly holes 34 (as well as the number of mounting holes 18 and locking post pairs 20) may vary.

The circular center base section 30 is surrounded by an annular ring section 36. The annular ring section 36 is raised above the circular center base section 30 such that the mounting holes 32 and the assembly holes 34 are recessed below the top surface of the raised annular ring section 36, thereby providing a recessed area where the tops of the locking post pairs 20 and the heads of mounting screws (not shown) may be disposed without protruding from above the top of the assembled optical fiber spool assembly 10.

The raised annular ring section 36 has a plurality of optical fiber retaining tabs 38 formed along a top surface thereof. As mentioned above, the plurality of optical fiber retaining tabs 38 formed on the inner spool component 14 are aligned with and accepted by the plurality of openings 26 formed between the plurality of optical fiber retaining walls 24 formed on the raised annular ring section 22 of the outer housing component 12 when the optical fiber spool assembly 10 is assembled.

The plurality of optical fiber retaining tabs 38 (as well as the plurality of openings 26 formed between the plurality of optical fiber retaining walls 24) are shown formed in a symmetrical pattern, but other patterns are also possible in accordance with the present invention. For example, the plurality of optical fiber retaining tabs 38 (as well as the plurality of openings 26 formed between the plurality of optical fiber retaining walls 24) may be formed in a different pattern which allows keyed assembly of the inner spool-.component 14 with the outer housing component 12, thereby insuring consistent assembly. Also, the number of optical fiber retaining tabs 38 (as well as the number of openings 26 formed between the plurality of optical fiber retaining walls 24) may vary.

The raised annular ring section 36 has a plurality of lip members 40 formed along a bottom surface thereof. The plurality of lip members 40 are preferably of the same thickness as the depth of the recess of the circular center base section 16 of the outer housing component 12. Thus, when the optical fiber spool assembly 10 is assembled, and the lower portion of the inner spool component 14 is seated within the recessed circular center base section 16 of the outer housing component 12 as mentioned above, the top surfaces of the plurality of lip members 40 and the raised annular ring section 22 form a substantially continuous level surface.

Referring to FIGS. 2A, 2B, and 2C, the optical fiber spool assembly 10 is shown assembled with the inner spool component 14 seated within the recessed circular center base section 16 of the outer housing component 12, with the plurality of optical fiber retaining tabs 38 aligned with and accepted by the plurality of openings 26 formed between the plurality of optical fiber retaining walls 24, with the two locking post pairs 20 aligned and engaged with the two assembly holes 34, and with the mounting holes 18 aligned with the mounting holes 32.

Figure 3A:
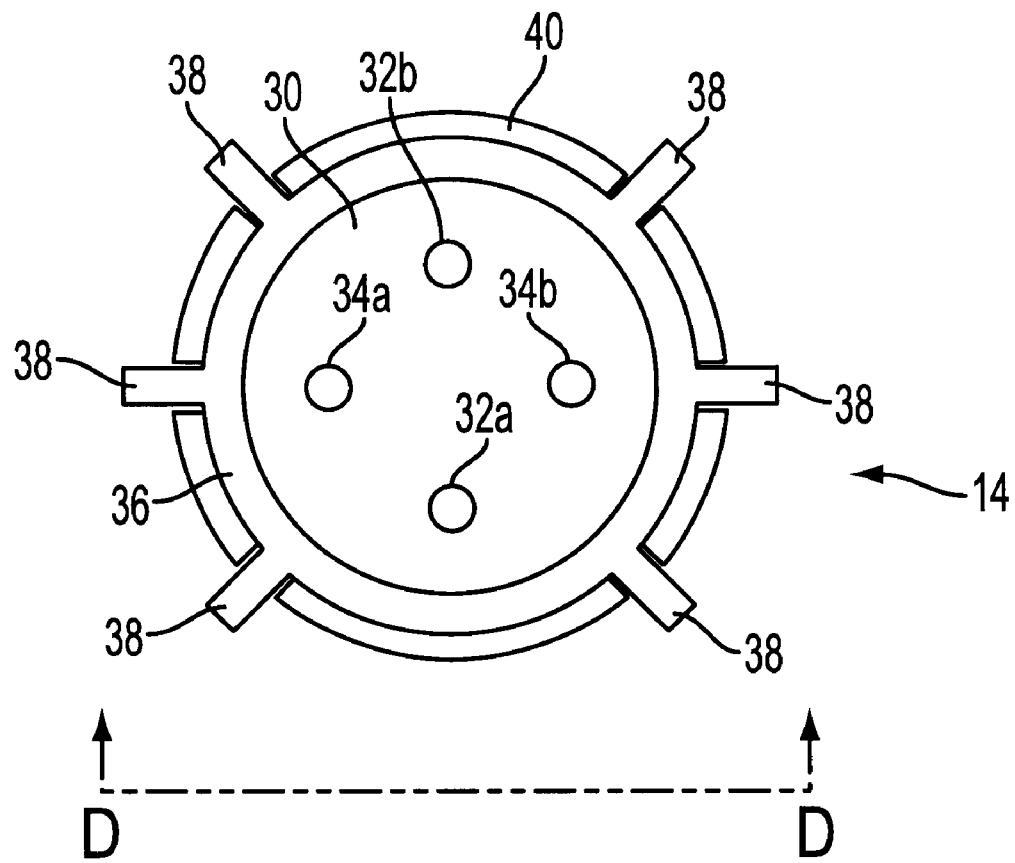
FIG. 3A is a top view of the inner spool component of the optical fiber spool assembly shown in FIG. 1 in accordance with the present invention.
Figure 3B:
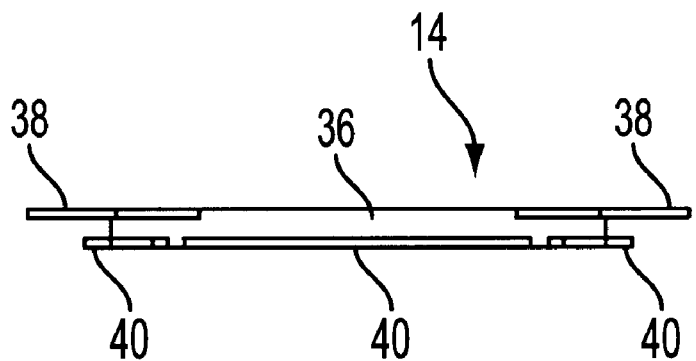
FIG. 3B is.a side view of the inner spool component of the optical fiber spool assembly shown in FIG. 3A along line D—D of FIG. 3A in accordance with the present invention.

Referring to FIGS. 3A and 3B, detailed views of only the inner spool component 14 are shown.

Figure 4A:
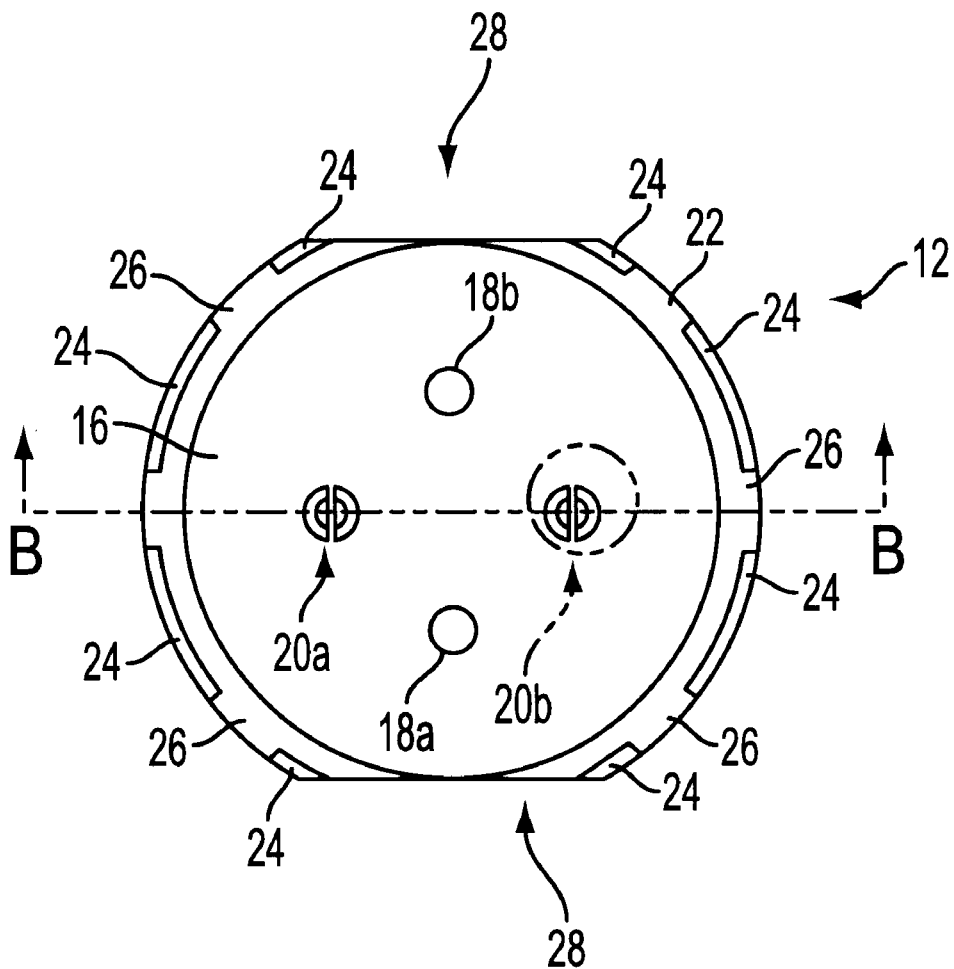
FIG. 4A is a top view of the outer housing component of the optical fiber spool assembly shown in FIG. 1 in accordance with the present invention.
Figure 4B:
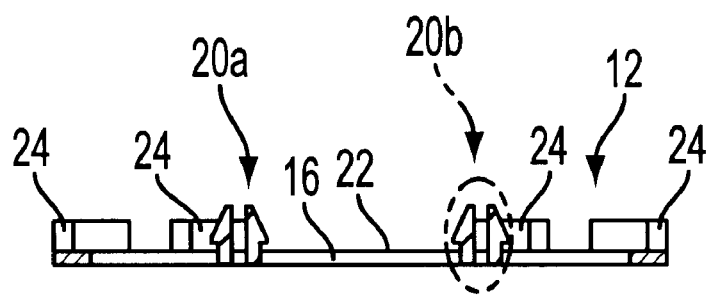
FIG. 4B is a partial cross-sectional side view of the outer housing component of the optical fiber spool assembly shown in FIG. 4A along line B—B of FIG. 4A in accordance with the present invention.

Referring to FIGS. 4A and 4B, detailed views of only the outer housing component 12 are shown.

Figure 5:
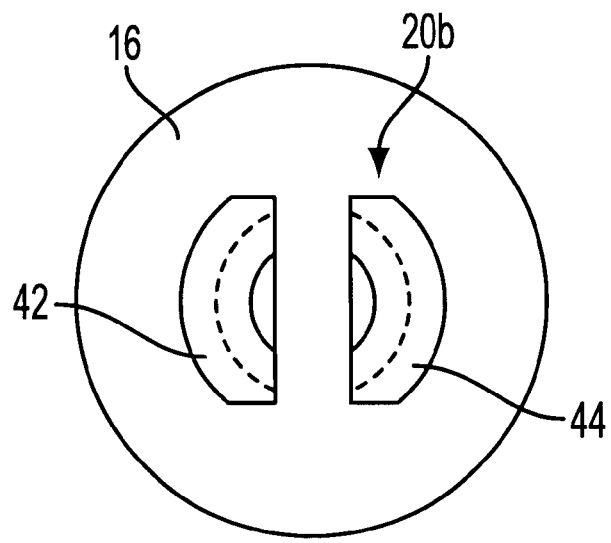
FIG. 5 is a detailed top view of a locking post pair of the outer housing component shown in FIG. 4A in accordance with the present invention.
Figure 6:
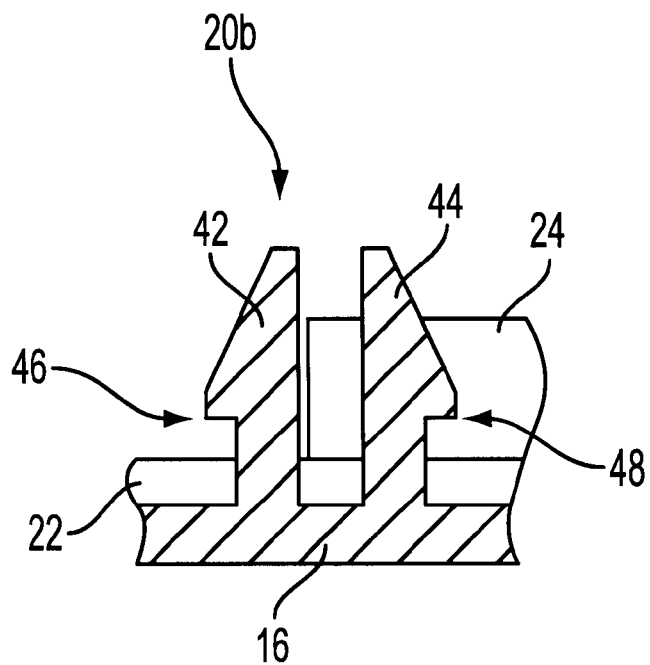
FIG. 6 is a detailed partial cross sectional side view of a locking post pair of the outer housing component shown in FIG. 4B in accordance with the present invention.

Referring to FIG. 5, a detailed top view of the locking post pair 20b is shown. Referring to FIG. 6, a detailed partial cross sectional side view of the locking post pair 20b is shown. As shown in FIGS. 5 and 6, the locking post pair 20b comprises a first locking post 42 and a second locking post 44. The first locking post 42 comprises a first locking lip 46 and the second locking post 44 comprises a second locking lip 48. Both the first locking lip 46 and the second locking lip 48 engage the circular center base section 30 of the inner spool component 14 after passing through the assembly hole 34b so that the inner spool component 14 is in locked assembly engagement with the outer housing component 12. Both the first locking post 42 and the second locking post 44 are required to be somewhat flexible so as to enable this engagement. Thus, the first locking post 42 and the second locking post 44 are preferably formed of a somewhat flexible material such as, for example, plastic, polypropylene, nylon, or any other material having the required flexible characteristics. Indeed, both the entirety of the outer housing component 12 and the inner spool component 14 may be formed of the same material as the first locking post 42 and the second locking post 44. Of course, the above discussion regarding locking post pair 20b also applies to locking post pair 20a.

In use, an optical fiber may be wound about the inner spool component 14, wherein the wound optical fiber is contained within an annular cavity formed on three sides by the raised annular ring section 36, the plurality of optical fiber retaining tabs 38, and the plurality of lip members 40. Since there is no retaining means on the fourth side (i.e., the outer side of the annular cavity), access to the annular cavity is always available during the winding process. Thus, the present invention inner spool component 14 lends itself to automation in contrast to prior art optical fiber spool devices which require manual winding.

After the optical fiber is wound about the inner spool component 14, the optical fiber spool assembly 10 may be assembled by simply snapping the inner spool component 14 and the outer housing component 12 together such that the locking post pairs 20a and 20b of the outer housing component 12 engage the assembly holes 34a and 34b of the inner spool component 14, respectively, as described above. Once assembled, the optical fiber that has been wound about the inner spool component 14 may be accessed through the plurality of openings 26 formed between the plurality of optical fiber retaining walls 24 of the outer housing component 12. Also, in the particular embodiment shown herein, the optical fiber that has been wound about the inner spool component 14 may be accessed through the openings formed between the plurality of optical fiber retaining walls 24 of the outer housing component 12 where the flats 28 are formed.

At this point it should be noted that the inner spool component 14 is formed such that the outer radius of the raised annular ring section 36 (i.e., the inner radius of the annular cavity where the optical fiber is wound) is greater than the bend radius limit of the optical fiber. Of course, this dimension may be varied depending upon any variations in the bend radius limit of different optical fibers (e.g., difference in bend radius limit between coated and uncoated optical fibers).

The present invention is not to be limited in scope by the specific embodiments described herein. Indeed, various modifications of the present invention, in addition to those described herein, will be apparent to those of ordinary skill in the art from the foregoing description and accompanying drawings. Thus, such modifications are intended to fall within the scope of the following appended claims. Further, although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes. Accordingly, the claims set forth below should be construed in view of the full breath and spirit of the present invention as disclosed herein.

What is claimed is:

1. An optical fiber spool assembly comprising:

an inner spool component having a first center base section surrounded by a first annular ring section, the first center base section having first assembly engagement means, the annular ring section having at least one optical fiber retaining tab formed along a top surface thereof and at least one lip member formed along a bottom surface thereof, the annular ring section, the at least one optical fiber retaining tab, and the at least one lip member forming three sides of an annular optical fiber cavity; and it an outer housing component having a second center base section surrounded by a second annular ring section, the second center base section having second assembly engagement means for engaging the first assembly engagement means, the second annular ring section having at least one optical fiber retaining wall formed thereon, the at least one optical fiber retaining wall having an inner diameter that is greater than an outer diameter of the first annular ring section such that the at least one optical fiber retaining wall forms a fourth side to the annular optical fiber cavity when the inner spool component and the outer housing component are assembled.

2. The optical fiber spool assembly as defined in claim 1, further comprising:

first assembly mounting means formed in the first center base section; and second assembly mounting means formed in the second center base section for aligning with the first assembly mounting means when the inner spool component and the outer housing component are assembled.

3. The optical fiber spool assembly as defined in claim 1, wherein the second center base section is recessed below the second annular ring section such that the first center base section and the at least one lip member are seated within the recessed second center base section, surrounded by the second annular ring section, when the inner spool component and the outer housing component are assembled.

4. The optical fiber spool assembly as defined in claim 1, wherein the first assembly engagement means and the second assembly engagement means engage so as to secure the inner spool component to the outer housing component, and vice versa, when the inner spool component and the outer housing component are assembled.

5. The optical fiber spool assembly as defined in claim 4, wherein at least one of the first assembly engagement means and the second assembly engagement means are formed of a flexible material for enabling the engagement between the first assembly engagement means and the second assembly engagement means.

6. The optical fiber spool assembly as defined in claim 1, wherein at least one opening is formed in the at least one optical fiber retaining wall, wherein the at least one opening is aligned with and accepts the at least one optical fiber retaining tab when the inner spool component and the outer housing component are assembled.

7. The optical fiber spool assembly as defined in claim 6, wherein the at least one opening provides access to the annular optical fiber cavity.

8. The optical fiber spool assembly as defined in claim 6, wherein the at least one optical fiber retaining tab comprises a plurality of optical fiber retaining tabs, wherein the at least one optical fiber retaining wall comprises a plurality of optical fiber retaining walls, wherein the at least one opening comprises a plurality of openings formed between the plurality of optical fiber retaining walls, and wherein the plurality of openings are aligned with and accept the plurality of optical fiber retaining tabs when the inner spool component and the outer housing component are assembled.

9. The optical fiber spool assembly as defined in claim 8, wherein the plurality of openings each provide access to the annular optical fiber cavity.

10. The optical fiber spool assembly as defined in claim 1, wherein an optical fiber may be wound about the inner spool component in the annular optical fiber cavity.

11. The optical fiber spool assembly as defined in claim 10, wherein the optical fiber is retained within the annular optical fiber cavity on three sides by the annular ring section, the at least one optical fiber retaining tab, and the at least one lip member.

12. The optical fiber spool assembly as defined in claim 11, wherein the optical fiber is retained within the annular optical fiber cavity on the fourth side by the at least one optical fiber retaining wall when the inner spool component and the outer housing component are assembled.

13. The optical fiber spool assembly as defined in claim 12, wherein the outer diameter of the first annular ring section corresponds to an inner radius of the annular optical fiber cavity that is greater than a bend radius limit of the optical fiber.

* * * * *